(12) United States Patent
Katic et al.

(10) Patent No.: US 8,995,518 B1
(45) Date of Patent: *Mar. 31, 2015

(54) EQUALIZER FOR HEAVILY CLIPPED OR COMPRESSED COMMUNICATIONS SIGNALS

(71) Applicant: PMC-Sierra, Inc., Sunnyvale, CA (US)

(72) Inventors: Ognjen Katic, Vancouver (CA); Paul V. Yee, Vancouver (CA); William D. Warner, Maple Ridge (CA)

(73) Assignee: PMC-Sierra, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/867,886

(22) Filed: Apr. 22, 2013

Related U.S. Application Data

(63) Continuation of application No. 12/359,046, filed on Jan. 23, 2009, now Pat. No. 8,428,113.

(51) Int. Cl.
*H03H 7/30* (2006.01)
*H04B 1/10* (2006.01)
*H04L 27/01* (2006.01)

(52) U.S. Cl.
CPC ...................................... *H04L 27/01* (2013.01)
USPC .......................................... 375/232; 375/346

(58) Field of Classification Search
USPC .......... 375/229, 232, 346, 348, 350; 708/300, 708/303, 304, 316, 322, 323
See application file for complete search history.

(56) References Cited

U.S. PATENT DOCUMENTS

| | | |
|---|---|---|
| 3,792,356 A | 2/1974 | Kobayashi et al. |
| 4,170,758 A | 10/1979 | Tamburelli |
| 4,283,788 A | 8/1981 | Tamburelli |
| 4,789,994 A | 12/1988 | Randall et al. |
| 5,020,078 A | 5/1991 | Crespo |
| 5,058,130 A | 10/1991 | Park |
| 5,396,519 A | 3/1995 | Betts et al. |
| 5,434,884 A | 7/1995 | Rushing et al. |
| 5,524,124 A | 6/1996 | Koenig |

(Continued)

FOREIGN PATENT DOCUMENTS

GB 2355639 4/2001

OTHER PUBLICATIONS

Austin, M.E.; Decision Feedback Equalization for Digital Communication over Dispersive Channels; M.I.T/R.L.E. Tech. Rep. 461; Aug. 11, 1967.

(Continued)

*Primary Examiner* — Young T. Tse
(74) *Attorney, Agent, or Firm* — Knobbe Martens Olson & Bear LLP

(57) ABSTRACT

Apparatus and methods mitigate a problem of equalizing communications signals that have been distorted by severe non-linearities such as clipping or harsh compression. For example, severe non-linearity occurs when signal compression or signal clipping occurs at rates above 20% of the data transmission interval. Severe non-linearities may significantly reduce system performance. Disclosed techniques selectively apply DSP equalization based on the detection of non-linearity for a present sample or one or more samples prior to the present sample. These techniques can be implemented in relatively low-cost high-speed SerDes designs to improve eye openings and reduce sensitivity to InterSymbol Interference (ISI) and to improve bit error rate (BER).

14 Claims, 5 Drawing Sheets

(56) References Cited

U.S. PATENT DOCUMENTS

| | | | |
|---|---|---|---|
| 5,539,774 | A | 7/1996 | Nobakht et al. |
| 5,581,585 | A | 12/1996 | Takatori et al. |
| 5,594,756 | A | 1/1997 | Sakurai et al. |
| 5,608,757 | A | 3/1997 | Smith et al. |
| 5,617,450 | A | 4/1997 | Kakuishi et al. |
| 5,675,612 | A | 10/1997 | Solve et al. |
| 5,748,674 | A | 5/1998 | Lim |
| 5,903,605 | A | 5/1999 | Crittenden |
| 5,991,339 | A | 11/1999 | Bazes et al. |
| 6,055,269 | A | 4/2000 | Drost et al. |
| 6,167,082 | A | 12/2000 | Ling et al. |
| 6,192,072 | B1 | 2/2001 | Azadet et al. |
| 6,307,884 | B1 | 10/2001 | Du et al. |
| 6,337,878 | B1 | 1/2002 | Endres et al. |
| 6,363,112 | B1 | 3/2002 | Azadet et al. |
| 6,384,858 | B1 | 5/2002 | Limberg |
| 6,414,990 | B1 | 7/2002 | Jonsson et al. |
| 6,418,164 | B1 | 7/2002 | Endres et al. |
| 6,426,972 | B1 | 7/2002 | Endres et al. |
| 6,452,975 | B1 | 9/2002 | Hannah |
| 6,501,792 | B2 | 12/2002 | Webster |
| 6,606,047 | B1 | 8/2003 | Borjesson et al. |
| 6,668,014 | B1 | 12/2003 | Endres et al. |
| 6,697,423 | B1 | 2/2004 | Jin et al. |
| 6,850,563 | B1 | 2/2005 | Hulyalkar et al. |
| 7,136,440 | B2 | 11/2006 | Brianti et al. |
| 7,154,946 | B1 | 12/2006 | Katic et al. |
| 7,177,352 | B1 | 2/2007 | Plasterer et al. |
| 7,242,712 | B1 | 7/2007 | Katic |
| 7,254,198 | B1 | 8/2007 | Manickam et al. |
| 7,266,145 | B2 | 9/2007 | Balasubramonian et al. |
| 7,336,729 | B2 | 2/2008 | Agazzi |
| 7,339,989 | B1 | 3/2008 | McAdam et al. |
| 7,340,006 | B2 | 3/2008 | Yun et al. |
| 7,346,119 | B2 | 3/2008 | Gorecki et al. |
| 7,469,003 | B2 | 12/2008 | Papasakellariou |
| 2002/0186916 | A1 | 12/2002 | Bessios |
| 2003/0063680 | A1 | 4/2003 | Nedic et al. |
| 2003/0112901 | A1* | 6/2003 | Gupta ............................ 375/340 |
| 2004/0001540 | A1 | 1/2004 | Jones |
| 2004/0234002 | A1 | 11/2004 | Yang et al. |
| 2005/0243955 | A1 | 11/2005 | Mondragon-Torres et al. |
| 2006/0008279 | A1* | 1/2006 | Chiang et al. .................. 398/202 |
| 2008/0049825 | A1 | 2/2008 | Chen et al. |
| 2008/0069198 | A1* | 3/2008 | Bhoja et al. .................... 375/233 |

OTHER PUBLICATIONS

George, D.A. et al.; An Adaptive Decision Feedback Equalizer; IEEE Transactions on Communication Technology; vol. Com-19; No. 3; Jun. 1971.

Ungerboeck, G.; Fractional Tap-Spacing Equalizer and Consequences for Clock Recovery in Data Modems; IEEE Transactions on Communications; vol. 24; Issue 8; pp. 856-864; Aug. 1976.

Qureshi, Shahid U. H.; Adaptive Equalization; Proceedings of the IEEE; vol. 73, No. 9; Sep. 1985; Institute of Electrical and Electronics Engineers, Inc.; pp. 1349-1381.

Brown, J. et al.; A CMOS Adaptive Continuous-Time Forward Equalizer, LPF, and RAM-DFE for Magnetic Recording; IEEE Journal of Solid-State Circuits; vol. 34, No. 2; Feb. 1999; pp. 162-169.

Kim, Y. et al.; A Decision-Feedback Equalizer with Pattern-Dependent Feedback for Magnetic Recording Channels; IEEE Transactions on Communications; vol. 49, No. 1; Jan. 2001; pp. 9-13.

Leblanc, J. P.; Enhanced RAM-Based Equalizers for Nonlinear Channels; Conference Record of the Thirty-Second Asilomar Conference on Signals, Systems and Computers; Nov. 1-4, 1997; Pacific Grove, California.

Bergmans, J. et al.; Dual Decision Feedback Equalizer; IEEE Transactions on Communications; vol. 45, No. 5; May 1997; pp. 514-518.

Woo, C. et al.; Advanced Dual Decision Feedback Equalizer for Perpendicular Magnetic Recording Channel; Magnetics Conference, 2002. INTERMAG Europe 2002. Digest of Technical Papers; 2002 IEEE; pp. GP4.

Jin, M. et al.; Dual FDTS/DF: A Unified Approach to Dual-Detection and Modification for MTR Codes; IEEE Transactions on Magnetics; vol. 37, No. 3; May 2001; pp. 1175-1186.

Chiani, M.; Introducing Erasures in Decision-Feedback Equalization to Reduce Error Propagation; IEEE Transactions on Communications; vol. 45, No. 7; Jul. 1997; pp. 757-760.

Yoo, H. et al.; Prediction Based Direct Blind Decision Feedback Equalization; 2002 IEEE International Conference on Acoustics; Speech and Signal Procession (27th); vol. 3; pp. 2481-2484.

Raphaeli, D. et al.; Partial Imaginary Precursor Cancelling in DFE for BPSK and GMSK Modulations; European Transactions on Telecommunications; vol. 12-6; pp. 461-469; 2001.

Bittner, et al.; Iterative Correction of Clipped and Filtered Spatially Multiplexed OFDM Signals; Proceedings of the 67th IEEE Vehicular Technology Conference (VTC'08); May 2008; pp. 953-957, Singapore.

USPTO; Office Action dated Nov. 14, 2011, from related U.S. Appl. No. 12/359,046, filed Jan. 23, 2009.

USPTO; Office Action dated Apr. 26, 2012, from related U.S. Appl. No. 12/359,046, filed Jan. 23, 2009.

USPTO; Office Action dated Oct. 12, 2012, from related U.S. Appl. No. 12/359,046, filed Jan. 23, 2009.

* cited by examiner

EQUALIZER FOR HEAVILY CLIPPED OR COMPRESSED COMMUNICATIONS SIGNALS

CROSS-REFERENCE TO RELATED APPLICATION

This application is a continuation application of U.S. application Ser. No. 12/359,046, filed Jan. 23, 2009, now U.S. Pat. No. 8,428,113, the entirety of which is incorporated by reference herein.

BACKGROUND

1. Field of the Invention

The invention generally relates to wired digital communications systems. In particular, the invention relates to the equalization of signals that can be severely distorted by non-linearities.

2. Description of the Related Art

Any of a variety of physical impairments can limit the effective transmission of data signals over communications channels. For example, the frequency selective nature of the channels can cause different frequency components of the input signal to be attenuated and phase-shifted differently. This can cause the impulse response of the channel to span several symbol intervals, resulting in time-smearing and interference between successive transmitted input symbols, commonly known as intersymbol interference (ISI). The ISI resulting from the channel distortion, if left uncompensated, can cause high error rates. The solution to the ISI problem is to design a receiver that compensates for the ISI in the received signal. The compensator for ISI is known as an equalizer.

A number of equalization techniques to mitigate ISI exist, including: (a) maximum likelihood sequence estimation (MLSE), in which a dynamic programming algorithm is used to determine the most likely transmitted sequence given observations of the received noisy and ISI-corrupted sequence and knowledge of the channel impulse response coefficients; (b) sub-optimal equalizer structures such as a linear equalizer (LE), wherein one simple finite impulse response (FIR) filter is used to mitigate ISI, or a non-linear decision feedback equalizer (DFE) that, in addition to the feed-forward FIR filter, employs a feedback filter (FBF) on the previously detected symbols; and (c) multi-carrier modulation (MCM), wherein the spectrum of the frequency-selective channel is divided into a large number of parallel, independent and approximately flat sub-channels using an orthogonal transformation.

MLSE uses a sequence of received signal samples over successive symbol intervals to make decisions about the transmitted symbols, and can be considered to be optimal from a bit error rate (BER) perspective. However, MLSE has a computational complexity that grows exponentially with the length of the channel time dispersion, and is typically prohibitively expensive to implement. In sub-optimal structures such as LE and DFE, data detection is done on a symbol-by-symbol basis and hence is much simpler to implement than the optimal MLSE. Linear equalization uses a linear filter with adjustable coefficients. Decision feedback equalization exploits a FBF to suppress that part of the ISI from the present estimate that was caused by previously detected symbols.

Advanced equalization techniques are usually too complex to be implemented using analog circuit design. Furthermore, even in the case of plain baseband communications that employ a simple LE, digital implementations are advantageous because of easy scalability to integrated circuit (IC) technologies of smaller dimensions. For this reason, most of the modern data receiver designs are digital, and a high-level description is illustrated in FIG. 1.

The received signal passes through the analog-front-end (AFE) block 102 that may include functions such as analog filtering, variable gain amplification (VGA), analog demodulation etc., depending on the application. Then, the signal is digitized in an analog-to-digital (ADC) conversion block 104. Finally, the digital signal samples are processed in a DSP receiver 106 that may include timing recovery, equalization and other types of advanced signal processing techniques.

Non-linearity of the overall communications channel from the data source to the DSP receiver 106 is one of the problems that can severely distort the signal and hence degrade the overall system performance. Examples of severe non-linearity are harsh signal compression and clipping.

A digital equalizer is typically very sensitive to a harsh non-linear distortion of the received signal. As an illustration, clipping can significantly reduce an equalizer's performance unless clipping occurs relatively infrequently, such as in less than 1% of the data transmission.

When dealing with the problem of equalizing clipped signals in MCM systems, some techniques are used to remove the effect of clipping by restoring the signal linearity through interpolation (see U.S. Pat. No. 6,606,047 to Borjesson, et al.). Or, some other algorithms are proposed to reduce the signal peak-to-average power ratio (PAPR) (see U.S. Pat. No. 7,340,006 to Yun, et al.).

In a wire-line application, one technique uses an equalizer on the transmit side and clips the transmit signal when overshoot occurs due to filtering (see U.S. Pat. No. 6,452,975 to Hannah).

Many digital communication systems attempt to avoid signal clipping. Examples of those approaches can be found in U.S. Pat. No. 7,336,729 to Agazzi and U.S. Pat. No. 7,346,119 to Gorecki, et al., both of which are applicable to high-speed serializer-deserializer (SerDes) digital designs.

One application of SerDes is to transfer data over backplane channels in chip-to-chip communications. An example of a channel impulse response (CIR) of a typical backplane at 6 Gbit/s is illustrated in FIG. 2.

The cursor level of the illustrated CIR is at 486.1 millivolts (mV), while its dominant post-cursor component is at 183.7 mV.

The following illustrative example is based on non-return to zero (NRZ) signaling that is relatively popular in SerDes applications. Under the assumptions of no correlations among the transmitted data, a Gaussian noise environment, and no non-linear distortions, the illustrated channel can be readily equalized with a linear minimum mean-squared-error (MMSE) equalizer because the MMSE equalizer is designed to minimize the slicer error variance and consequently bit-error-rate (BER).

The channel described earlier in connection with FIG. 2 does not introduce a severe ISI distortion, and hence, a relatively simple 2-tap equalizer having values as computed from CIR using the formulas can be used:

$$c_0 = \frac{h_0 \cdot \sum_n h_n^2 - h_{-1} \cdot \sum_n (h_{n-1} \cdot h_n)}{\left(\sum_n h_n^2\right)^2 - \left(\sum_n (h_{n-1} \cdot h_n)\right)^2} \qquad \text{Eq. 1}$$

$$c_1 = \frac{h_{-1} \cdot \sum_n h_n^2 - h_0 \cdot \sum_n (h_{n-1} \cdot h_n)}{\left(\sum_n h_n^2\right)^2 - \left(\sum_n (h_{n-1} \cdot h_n)\right)^2} \qquad \text{Eq. 2}$$

In Equations 1 and 2 above, $h_n$ represent samples of CIR at baud rate, with $h_0$ being the cursor and $h_{-1}$ the precursor.

The optimal tap values of the example channel are $[c_0, c_1] = [2.12, -0.80]$.

In high-speed SerDes designs, the equalizer taps are usually normalized so that the first tap is equal to 1. Then, a 2-tap post-cursor equalizer is usually called a single tap equalizer.

This normalization does not change the equalizer shape or overall system performance. In the following example, a normalized equalizer, but this does not limit the equalizer does not need to be normalized.

As a result, the normalized tap $C_1$ can be found from Equations 1 and 2 as:

$$c_1' = \frac{h_{-1} \cdot \sum_n h_n^2 - h_0 \cdot \sum_n (h_{n-1} \cdot h_n)}{h_0 \cdot \sum_n h_n^2 - h_{-1} \cdot \sum_n (h_{n-1} \cdot h_n)} \qquad \text{Eq. 3}$$

The optimal single tap post-cursor equalizer of the foregoing example is $[1, -0.38]$.

If the received and equalized signal samples are denoted as $x_n$ and $y_n$ respectively, their relation in the normalized equalizer form is given in Equation 4:

$$y_n = x_n + c_1' \cdot x_{n-1} \qquad \text{Eq. 4}$$

FIG. 3 illustrates received and equalized signal traces. FIG. 3 illustrates that equalizing clipped signals can be ineffective.

BRIEF DESCRIPTION OF THE DRAWINGS

These drawings and the associated description herein are provided to illustrate specific embodiments of the invention and are not intended to be limiting.

SUMMARY OF THE DISCLOSURE

It can be difficult to equalize signals that have been distorted by severe non-linearities such as clipping or harsh compression. Harsh compression can occur with an input-output transfer characteristic of at least 1 decibel (dB) of compression in an operating range. For example, severe non-linearity occurs when signal compression or signal clipping occurs at rates above 20% of the data transmission interval. Severe non-linearities may significantly reduce system performance. Disclosed techniques selectively apply digital signal processing (DSP) equalization based on the detection of non-linearity for a present sample or one or more samples prior to the present sample. These techniques can be implemented in relatively low-cost high-speed SerDes designs to improve eye openings and reduce sensitivity to Inter-Symbol Interference (ISI) and to improve bit error rate (BER).

DETAILED DESCRIPTION OF SPECIFIC EMBODIMENTS

Signals that are distorted by non-linearities can be ineffectively compensated by existing techniques. Examples of sources for such non-linearities include compression and clipping. Disclosed techniques determine when such non-linearities are present and adjust the compensation for intersymbol interference (ISI). The disclosed techniques can be used in high-speed SerDes designs that are based on low-cost DSP approaches. These improvements can be incorporated into the DSP receiver 106 (FIG. 1).

Figure 1:
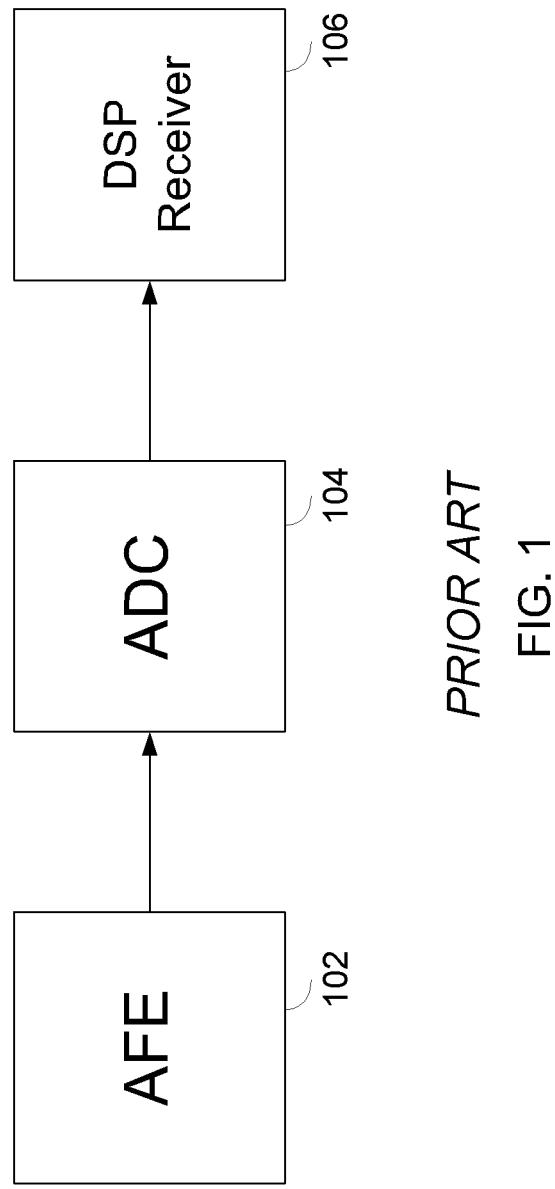
FIG. 1 illustrates an example of a digital data receiver.

Disclosed techniques can be implemented relatively simply and inexpensively in a high-speed SerDes because they can be used with relatively low resolution for the analog-to-digital converter (ADC) 104 (FIG. 1). Despite the use of a relatively low resolution ADC 104, the SerDes should be able to tolerate severe non-linear distortion of the received signals, such as heavy clipping (not just occasional clips of less than 1%). For example, typically an ADC 104 having 3-5 bits of resolution, depending on the application, can be used. Because a low resolution ADC can be used, the disclosed techniques can be significantly less complex and hence more cost effective than the conventional designs that rely on keeping or restoring the signal linearity. Of course, higher resolution ADCs can be used. In one embodiment, the ADC 104 quantizes its soft symbol output to at least 3 bits.

Although particular embodiments are described herein, other embodiments of the invention, including embodiments that do not provide all of the benefits and features set forth herein, will be apparent to those of ordinary skill in the art.

Figure 3:
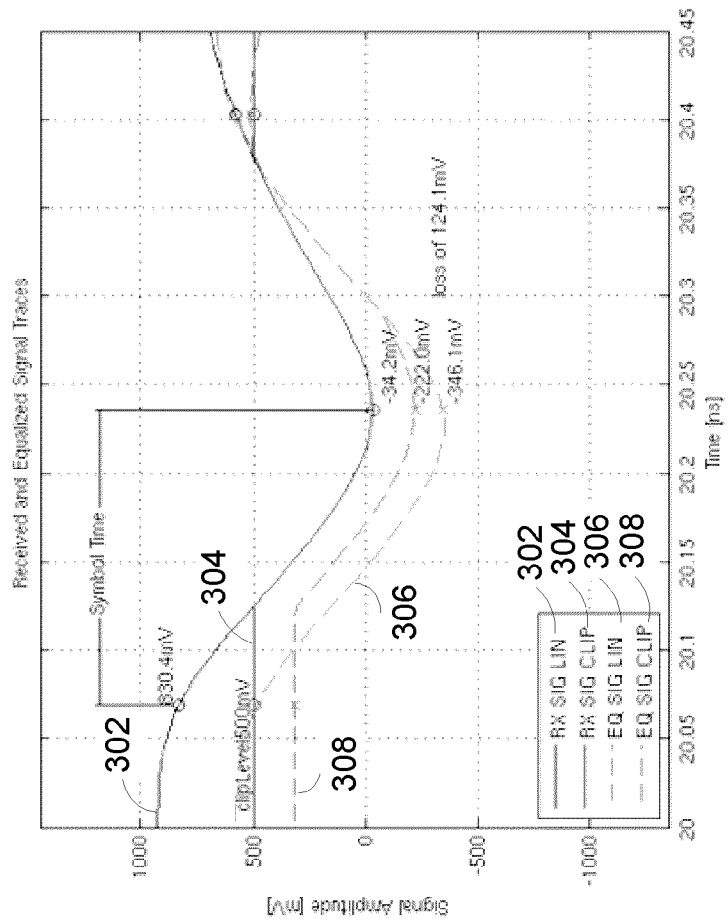
FIG. 3 illustrates received and equalized signal traces.

Returning now to FIG. 3, the worst case ISI data sequences for an equalizer are those which reduce a current sample $x_n$ to be relatively small, when the prior sample $x_{n-1}$ was relatively large. As a result, the current sample $x_n$ may be within the linear range, while the prior sample $x_{n-1}$ can be in a severely non-linear range of the input/output transfer characteristic. Depending on the AFE and ADC design, it is possible that the prior sample $x_{n-1}$ is significantly modified and rather than being described by the Equation 4, the behavior follows Equation 5:

$$y\_nl_n = x_n + c_1' \cdot \text{sign}(x_{n-1}) \cdot \text{nl\_level} \qquad \text{Eq. 5}$$

A variable nl_level of Equation 5 depends on the communications channel input/output transfer. When the non-linearity is described by a limiter, nl_level=clip_level.

Figure 2:
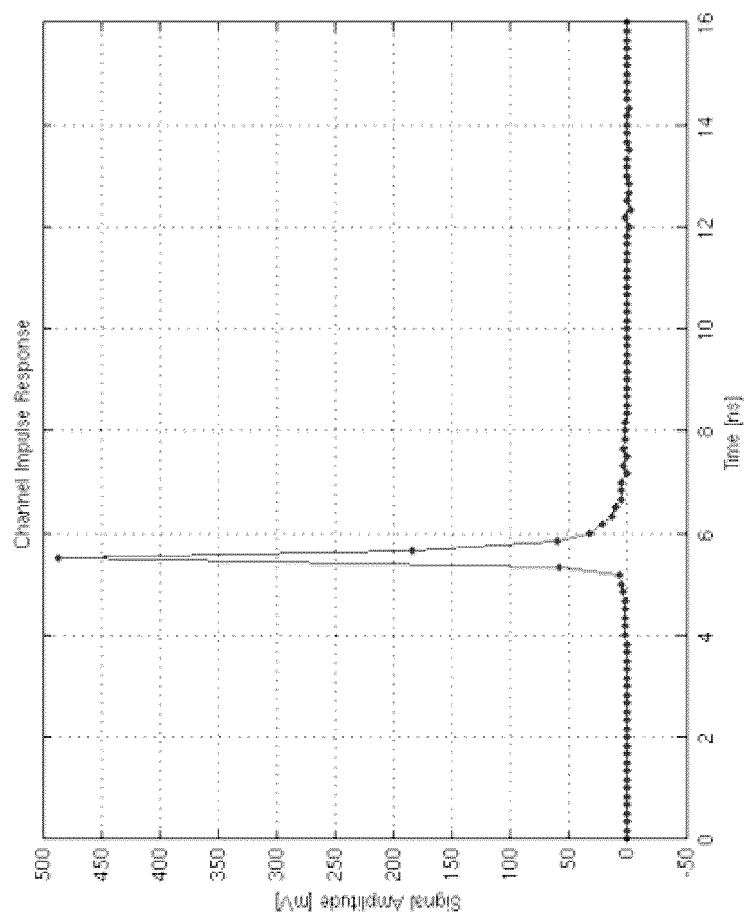
FIG. 2 illustrates an impulse response of a typical backplane channel.

The signal traces 302, 304, 306, 308 illustrate Equations 4 and 5 when the signal non-linearity is described by a simple limiter. The clip level of the example is set to 500 mV, which results in a clipping rate of 50%. The signal traces correspond to a channel having the channel impulse response (CIR) described earlier in connection with FIG. 2.

Without clipping, the received worst-case ISI signal trace (described earlier in connection with Equation 4 and Equation 5) produces an eye opening of only 34.2 mV. When the linear equalizer is applied to the non-clipped signal 302, the eye opening of the equalized signal 306 is improved to 346.1 mV.

When clipping is applied to the received signal 304 at 500 mV and above, the eye opening of the equalized signal 308 is only 222.0 mV (obtained via Equation 5). In other words, there is a loss of 124.1 mV in the eye opening as a consequence of clipping. This scenario results in less immunity to noise and therefore increases the bit error rate (BER) of the receiver.

While the problems with clipping have been described in the context of a single tap post-cursor equalizer, similar problems exist with more complex equalizers and other types of non-linearities. Accordingly, the solutions to these problems are not limited to single tap post-cursor equalizers. Moreover, while described in the context of high-speed SerDes devices, the principles and advantages described herein are applicable to any communications or other system that employs similar DSP techniques and has a signal clipping problem. In addition, while illustrated in the context of clipped signals, the principles and advantages described herein are also applicable to other sources of non-linearities, such as compressed signals.

When a received signal is heavily clipped, such as clipping rates that can be well above 20%, the soft information that is needed for proper application of equalization in accordance with Equation 4 is destroyed. In that case, some way to retrieve the soft information to increase the reliability of the soft sample and consequently to reduce BER is desirable. The following observations should be noted in handling a clipped signal.

One observation is that the probability of making a bit error on a clipped sample itself is very low because the signal for the clipped sample is already strong enough to be significantly above the slicer threshold level of 0 V in NRZ signaling. Thus, the corruption of the clipped sample by adjacent ISI symbols is not a concern. Thus, the clipped samples themselves do not need to be equalized.

When a current sample is relatively low in magnitude and is thus not clipped, the sample can be corrupted by a significant amount of ISI. For example, the current sample can be very low in magnitude. In this case, the equalizer should be applied to increase the system immunity to wrong decisions. That is, the small ISI-corrupted sample should be pushed away from the slicer threshold level so that it is more resistant to noise.

When the previous sample had not been clipped, normal linear equalization can be applied to the current sample. By contrast, when the previous sample had been clipped, there is a loss in the eye opening for the current sample as discussed earlier in connection with FIG. 3.

One solution is to modify the behavior of the equalizer from that characterized by Equation 5 to that characterized by Equation 6 via a weighting factor w.

$$y\_nl_n = x_n + w \cdot c_1 \cdot \text{sign}(x_{n-1}) \cdot nl\_level$$

$$nl\_level = clip\_level \quad \text{Eq. 6}$$

Weighting factor w can be determined from the clipping conditions and it is bounded between the following limits:

$$1 \leq w \leq w\_max \quad \text{Eq. 7}$$

$$w\_max = \frac{1 - 2^{-num\_ADC\_bits}}{clip\_level}$$

In Equation 7, num_ADC_bits represents a number of bits quantized by an analog-to-digital converter for the soft symbol samples and in Equations 6 and 7, clip_level represents a magnitude level wherein a soft symbol is clipped.

The choice of a value for the weighting factor w is critical for the overall performance as too small values do not improve the eye opening for the worst-case sequences, while too large values can cause an error in the sequences where the current sample is just below the clipping level, while the previous one was clipped. Furthermore, a large weighting factor w can severely destroy horizontal eye opening which is crucial for the jitter tolerance behavior.

Depending on the channel conditions and application, the weighting factor w can be easily determined in advance by adjusting the weighting factor w until the optimal performance is reached in means of the eye opening or bit error rate (BER). Then, the weighting factor w can be fixed for the particular application. Alternatively, the weighting factor w can be adapted during operation if, in the context of SerDes, monitoring of the eye opening is available.

Table 1 illustrates an example of behavior of an embodiment of a single tap post-cursor equalizer for non-linear signals.

TABLE I

| $x_{n-1}$ | $x_n$ | $y_n$ |
|---|---|---|
| don't care | above non-linear threshold | $x_n$ |
| below non-linear threshold | below non-linear threshold | $x_n + c_{1A} x_{n-1}$ (normal equalization Eq. 4) |
| above non-linear threshold | below non-linear threshold | $x_n + w_n c_{1B} \text{sign}(x_{n-1}) \cdot nl\_level$ (weighted equalization Eq. 6) |

For the case of simple limiter non-linearity, in Table 1 "above non-linear threshold" means that the signal is clipped, while "below non-linear threshold" means that it is not clipped. Although described for the case in which there are three distinct cases with respect to a hard non-linear threshold, the principle can be extended to more cases, and in the continuous as well as discrete domain.

As illustrated in Table 1, equalization is not applied when the current sample is clipped, but is applied in a normal way when both the current and the previous samples are not clipped. When the current sample is not clipped and the previous sample is clipped, equalization is applied with the weighted value of $c_{1B}$.

The two weight values $c_{1A}$ and $c_{1B}$ in the first approximation can be made equal to the linear MMSE solution determined from Equation 3. However, as each of them is applied to different portions of the transmitted sequence, their optimization can be done by using Equation 3 twice if the linear MMSE solutions that include information about two portions of data sequence can be obtained in advance.

An optimal linear MMSE equalizer with a limited number of taps includes all spectral characteristics in the data path. The process of data sub-selection for the application of equalization introduces data correlations that compensate different parts of the channel spectrum. In other words, two MMSE equalizers, each of which is applied to one of the sub-sequences (smaller subset than the whole sequence), perform better than a single MMSE equalizer that deals with the whole sequence at once.

The weighting factor $w_n$ can be determined based on the clipping conditions. One way of making a decision on the amount of tap weighting to be used is to use a non-linear threshold (NLT) processing block that finds the number of previously clipped samples (or more generally, samples above a non-linear threshold) over time. For example, if only one previous sample is clipped, a weight $w_1$ may be used. While, for two previously clipped samples, a weight $w_2$ may be used, where $1<=w_1<=w_2<=w\_max$. This may be further generalized for n previously clipped samples.

One embodiment of the NLT processing block that uses the non-linear threshold (NLT) indicator of the two previous samples is described by Table 2 and can be extended to more than two previous samples. Other types of NLT processors that determine the level of tap weighting are possible.

TABLE 2

NLT Processor of the Equalizer for Non-linear Signals

| NLT_indicator$_{-2}$ | NLT_indicator$_{-1}$ | NLT_indicator$_0$ | Equalizer Application |
|---|---|---|---|
| 0 | 0 | 0 | normal equalization |
| 0 | 0 | 1 | disable |
| 0 | 1 | 0 | $w_1$ equalization |
| 0 | 1 | 1 | disable |
| 1 | 0 | 0 | normal equalization |
| 1 | 0 | 1 | disable |
| 1 | 1 | 0 | $w_2$ equalization |
| 1 | 1 | 1 | disable |

One implementation applied to high speed SerDes uses fixed taps obtained from the linear MMSE receiver with two stages of tap weighting equal to 1.1 and 1.2, respectively.

One embodiment of the invention uses a single tap post-cursor equalizer with 2 levels of tap weighting. However, the single tap pre-cursor equalizer or DFE may be modified to extend the technique to more taps. The disclosed technique is also not limited to the non-linearity caused by a simple limiter. The disclosed technique can be generalized to different types of non-linearities such as compression and others. In the case of compression, clip_level can be substituted with compr_level while clip_indicator can be substituted with compr_indicator.

In other words, start of compression point defines the range below which the equalizer application is bypassed whereas the compression indicator, in the same way as the clip indicator, determines when the weighted or linear equalizer is employed. Different ranges of tap weighting may be defined according to one or more different criteria such as clipping, compression and other non-linearities. In addition, the described method can be applied to other types of non-linearities.

Figure 4:
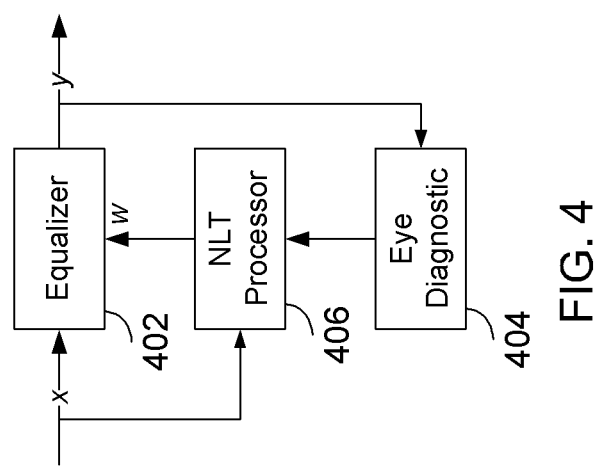
FIG. 4 illustrates an equalizer for non-linear signals with eye diagnostic monitoring.

FIG. 4 illustrates an equalizer 402 for non-linear signals with eye diagnostic monitoring. The embodiment illustrated in FIG. 4 includes the equalizer 402, an eye diagnostic or monitoring block 404, and a non-linear threshold (NLT) processor 406. The eye diagnostic or monitoring block 404 provides information to the NLT processor 406 to make a more intelligent decision about the tap weights.

The eye diagnostic block 404 captures information regarding signal transitions that are affected by equalizer operation. This information is passed to the NLT processor 406 which is then able to determine if the applied tap weights are appropriate by evaluating the horizontal or vertical eye opening and, if necessary, adapt them to achieve better performance. A one-dimensional optimization algorithm can be used to improve the eye by adjusting the weight w. The complexity of this solution is compensated by an increase in the flexibility and efficiency of the equalizer for non-linear signals.

Figure 5:
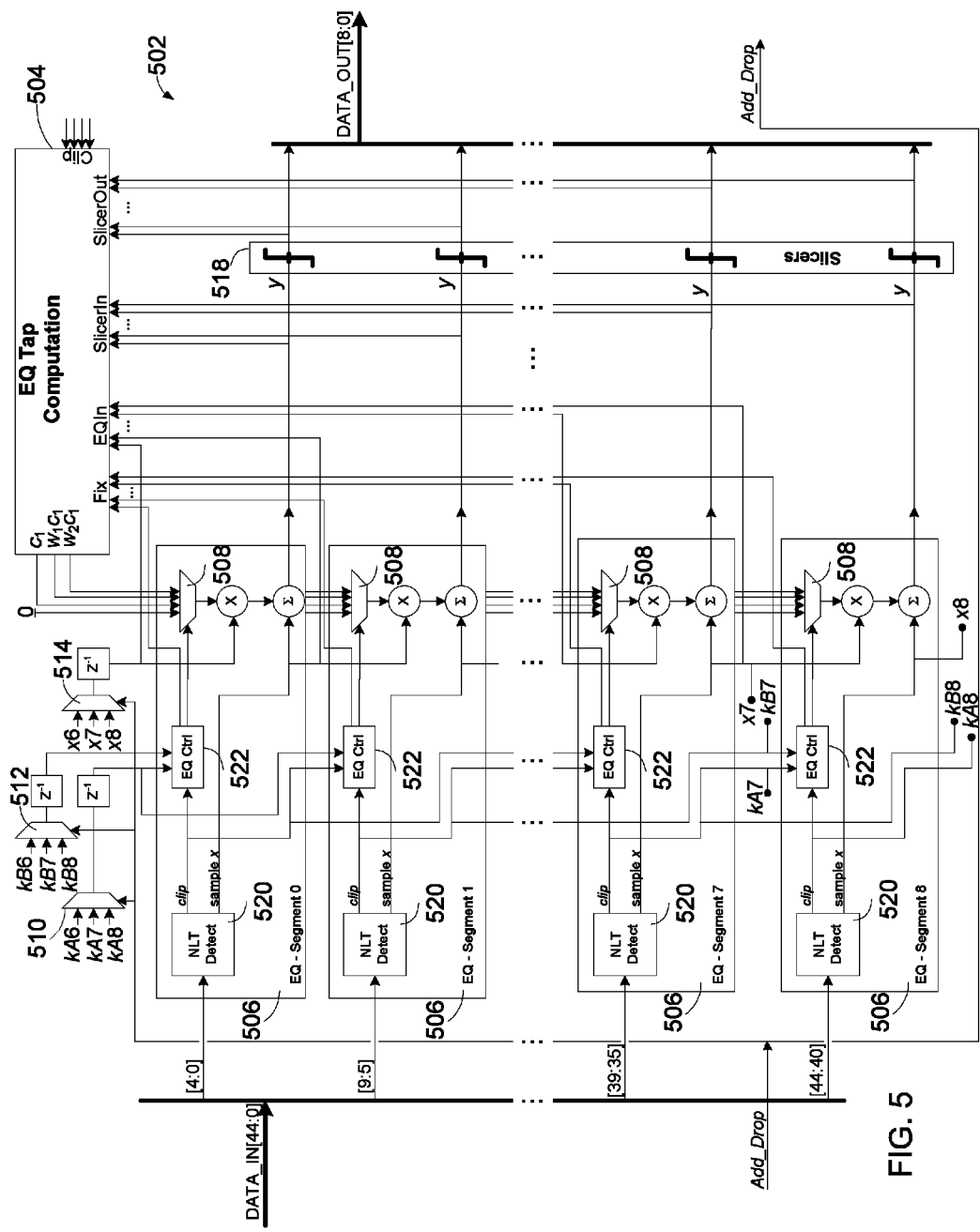
FIG. 5 illustrates an embodiment of a pipelined equalizer for non-linear signals.

FIG. 5 illustrates an embodiment of the invention implemented in a hardware integrated circuit, such as an application specific integrated circuit (ASIC), field programmable gate array (FPGA), or the like. The illustrated embodiment can be considered to be a pipelined architecture because each equalizer segment 506 of the DSP receiver 502 takes some outputs from the previous segments (signals $x_n$, $k_{An}$ and $k_{Bn-1}$, where n=0, . . . , 8 mod (6, 7, or 8) depending on the Add_Drop signal). In FIG. 5, x refers to the equalizer input samples and k corresponds to the NLT_indicator from Table 2, while A and B designate 1 and 2 symbols earlier in time, respectively, and n is a segment index corresponding to the symbol time. Notice also that $k_{Bn}=k_{An-1}$. So, in normal operation, when there are no frequency offsets between the transmit and received data clocks, a serial input data stream is paralleled into 8 parallel streams which are then passed to 8 identical equalizer segments 506. This means that n=0, . . . , 7. However, as will be explained later, 9 parallel streams are used in the illustrated embodiment.

In the equalization process, the input sample of segment 0 represents the previous input sample of segment 1, while the input sample of segment 1 represents the previous input sample of segment 2 and so on up to the last segment 7. The input sample x7 of segment 7 should be delayed by one symbol and passed to the next block of parallel data to be used as a previous input sample of segment 0.

The same process is applied to the clip output of NLT detector 520, where NLT indicator (clip) for the input sample of segment 0 is passed to the segments 1 and 2 for which it represents the previous and the two previous symbols indicator (reference Table 2 that is implemented in the EQ Ctrl block 522 of each segment). Obviously, the NLT indicators of segment 0 are obtained from the previous block of parallel input data from segments 6 and 7. However, the illustrated embodiment assumes that the receiver is clocked with a free running clock that is close, but not identical to the transmit clock.

Since a frequency offset between those two clock signals can exist, it is possible for one bit to be dropped or to be duplicated depending on the direction of the frequency offset. To mitigate this problem, the data can be paralleled into 9 streams rather than the minimum 8 streams. During normal operation, the signal Add_Drop controls multiplexers 510, 512 and 514 so that the middle inputs kA7, kB7, and ×7, respectively, which correspond to the outputs of equalizer segment 7, are passed to equalizer segment 0. However, when a timing control block (not shown) determines the direction of the clock frequency offset and that a bit has been dropped or duplicated, it activates the signal ADD_DROP so that either the outputs of equalizer segment 6 or equalizer segment 8 are passed instead. It will be apparent that the amount of paralleling or pipelining can vary depending on the application. Such paralleling or pipelining reduces clock speeds. The illustrated embodiment uses 8 parallel equalizer slices.

In the illustrated embodiment, the input samples x are quantized to 5 bits, although they may alternatively be provided by one or more analog-to-digital converters with fewer bits (not shown), such as 3 or 4 bits. For example, [4:0] indicates 5 bits of data for a particular sample.

An equalizer tap computation block 504 generates tap values that correspond to the linear equalizer case and two weighted cases. The equalizer tap computation block 504 can be implemented in hardware and/or in software, including firmware. For example, a processor coupled to a memory can execute instructions to generate tap values. In one embodiment, for linear equalizer operation (not clipped or compressed), computation of the tap values is performed in accordance with Equation 3, and for non-linear equalizer operation, computation may be done using a known training sequence. After computation, the linear equalizer tap value $c_1$ can be fixed, the equalizer operates in data transmission mode, and the NLT indicator signal clip from one or more equalizer segments 506 is used to select the required tap weighting. The same tap values are provided to the multiplexers 508 of each of the equalizer segments 506. The multiplexers 508 select which tap value is to be applied to a particular prior sample to perform equalization. Thus, for example, sample x[9:5] can be equalized by multiplying the prior sample x[4:0] with a selected tap value, which, in the illustrated example, can vary from 0, $c_1$ (normal equalization), and two weighted tap values equal to $w_1 c_1$ and $w_2 c_1$.

The particular tap value to be selected by the multiplexer 508 is determined by the equalizer control block 522 of each segment 506. For example, if the NLT indicator signal clip for the data sample $x_n$ indicates that the magnitude is above the non-linear threshold, then equalization can be bypassed for the data sample by, for example, multiplying the prior sample $x_{n-1}$ by a tap value of 0.

The particular tap value is selected depending on the NLT indicator status, which is then multiplied with the prior sample $x_{n-1}$ and summed with the present sample $x_n$ to generate an equalized sample y. The equalized sample y is then sliced by a slicer 518 to generate a hard decision for the sample, which is the output data.

Alternative embodiments can be developed both in software, firmware and/or hardware. For example, the context of a relatively slow communication system, such as a telephone modem, ISDN modem, DSL modem, cable modem, or the like, the digital signal processing techniques can be implemented for a communications receiver by firmware or software executed by a processor in real time. In one application, tap computation can be performed in software with varying degrees of hardware-assist. Yet, in other applications, one or more dedicated processors may be used to implement the tap computations.

The disclosed equalizer for non-linear signals offers a solution to the problem of reduced system performance when the received signal is severely distorted by non-linearities such as compression or in extreme cases, by heavy clipping. As a result, the disclosed equalizer enables flexible designs of low-cost digital SerDes that can be easily scaled in IC technologies of smaller dimensions. The disclosed techniques are also applicable to other areas of digital communications systems in which similar problems are encountered.

Various embodiments have been described above. Although described with reference to these specific embodiments, the descriptions are intended to be illustrative and are not intended to be limiting. Various modifications and applications may occur to those skilled in the art.

What is claimed is:

1. A method of equalization in a receiver, the method comprising:
   receiving a communications signal having symbols embedded therein;
   converting, by a detection circuit, the received communications signal from analog form to digital form to generate a digital received signal comprising soft symbols, wherein the digital received signal is quantized to at least 3 bits; and
   selectively equalizing a current soft symbol sample based at least partly on a determination of whether or not the current soft symbol sample, a first prior soft symbol sample, or a second prior soft symbol sample have been determined by the detection circuit to have been non-linearly distorted beyond a threshold, wherein the first prior soft symbol sample is an immediately prior soft symbol sample to the current soft symbol sample, wherein the second prior soft symbol sample is an immediately prior soft symbol sample to the first prior soft symbol sample, wherein distortion beyond the threshold indicates clipping, harsh compression, or both clipping and harsh compression, wherein selectively equalizing further comprises:
   using a normal coefficient $c_1$ for equalization when none of the current soft symbol sample, the first prior soft symbol sample, and the second prior soft symbol sample have been non-linearly distorted beyond the threshold;
   using a first weighted coefficient $w_1 c_1$ when the first prior soft symbol sample has been non-linearly distorted beyond the threshold; and
   using a second weighted coefficient $w_2 c_1$ when the second prior soft symbol sample has been non-linearly distorted beyond the threshold.

2. The method of claim 1, wherein selectively equalizing further comprises:
   selecting a tap value from a plurality of tap values of the coefficients, wherein the selected tap value varies depending upon whether or not non-linear distortion is indicated;
   multiplying the selected tap value and at least one of the first and second prior soft symbol samples to generate a weighted prior soft symbol sample; and
   summing the current soft symbol sample and the weighted prior soft symbol sample to generate an equalized current soft symbol sample.

3. The method of claim 2, further comprising slicing the equalized current soft symbol sample to generate a hard symbol sample.

4. The method of claim 3, wherein at least a portion of values for the plurality of tap values is determined based on eye diagnostics.

5. The method of claim 2, wherein the current soft symbol sample is equalized using a plurality of prior soft symbol samples.

6. The method of claim 5, wherein equalizer coefficients are selected based on a non-linear distortion status of the current soft symbol sample and the plurality of prior soft symbol samples.

7. A non-transitory computer-readable recording medium comprises computer-executable instructions stored thereon, which when executed by a processor configured to execute the computer-executable instructions, are adapted to perform the method of claim 1.

8. An apparatus for equalization in a receiver, the apparatus comprising:
   means for receiving a communications signal having symbols embedded therein;
   a detection circuit for converting the received communications signal from analog form to digital form to generate a digital received signal comprising soft symbols, wherein the digital received signal is quantized to at least 3 bits; and
   means for selectively equalizing a current soft symbol sample based at least partly on a determination of whether or not the current soft symbol sample, a first prior soft symbol sample, or a second prior soft symbol sample have been determined by the detection circuit to have been non-linearly distorted beyond a threshold, wherein the first prior soft symbol sample is an immediately prior soft symbol sample to the current soft symbol sample, wherein the second prior soft symbol sample is an immediately prior soft symbol sample to the first prior soft symbol sample, wherein the distortion beyond the threshold indicates clipping, harsh compression, or both clipping and harsh compression, wherein the means for selectively equalizing is configured to:

use a normal coefficient $c_1$ for equalization when none of the current soft symbol sample, the first prior soft symbol sample, and the second prior soft symbol sample have been non-linearly distorted beyond the threshold;

use a first weighted coefficient $w_1 c_1$ when the first prior soft symbol has been non-linearly distorted beyond the threshold; and use a second weighted coefficient $w_2 c_1$ when the second prior soft symbol has been non-linearly distorted beyond the threshold.

9. An apparatus for equalization in a receiver, the apparatus comprising:

a detection circuit configured to receive a digital received signal comprising soft symbols, wherein the digital received signal is quantized to at least 3 bits, wherein the detection circuit is configured to determine whether a sample has been non-linearly distorted beyond a threshold, wherein distortion beyond the threshold indicates clipping, harsh compression, or both clipping and harsh compression; and an equalizer configured to generate an equalized current soft symbol sample and to adjust equalization based at least partly on whether or not a current soft symbol sample, a first prior soft symbol sample, or a second prior soft symbol sample have been determined by the detection circuit to have been non-linearly distorted beyond the threshold, wherein the first prior soft symbol sample is an immediately prior soft symbol sample to the current soft symbol sample, wherein the second prior soft symbol sample is an immediately prior soft symbol sample to the first prior soft symbol sample, wherein the equalizer is further configured to use a normal coefficient $c_1$ for equalization when none of the current soft symbol sample, the first prior soft symbol sample, and the second prior soft symbol sample have been non-linearly distorted beyond the threshold, wherein the equalizer is further configured to use a first weighted coefficient $w_1 c_1$ when the first prior soft symbol has been non-linearly distorted beyond the threshold, and wherein the equalizer is further configured to use a second weighted coefficient $w_2 c_1$ when the second prior soft symbol has been non-linearly distorted beyond the threshold.

10. The apparatus of claim 9, wherein the equalizer comprises:

a multiplexer circuit configured to receive a plurality of tap values from the coefficients, wherein the plurality of tap values vary in value;

an equalizer control block configured to control the multiplexer circuit to select a tap value based on a pattern of non-linear distortion observed in the current soft symbol sample and at least one of the first and second prior soft symbol samples;

a multiplier circuit configured to multiply the selected tap value from the multiplexer circuit and the at least one of the first and second prior soft symbol sample to generate a weighted prior soft symbol sample; and a summing circuit configured to sum the current soft symbol sample and at least the weighted prior soft symbol sample to generate the equalized current soft symbol sample.

11. The apparatus of claim 10, further comprising a slicer configured to slice the equalized current soft symbol sample to generate a hard symbol sample.

12. The apparatus of claim 10, wherein at least a portion of values for the plurality of tap values is determined based on eye diagnostics.

13. The apparatus of claim 10, wherein the equalizer is further configured to equalize the current soft symbol sample with a plurality of prior soft symbol samples.

14. The apparatus of claim 13, wherein the equalizer is further configured to apply equalizer coefficients based on a non-linear distortion status of the current soft symbol sample and the plurality of prior soft symbol samples.

* * * * *